United States Patent
Peyravian et al.

(10) Patent No.: US 6,742,119 B1
(45) Date of Patent: May 25, 2004

(54) TIME STAMPING METHOD USING TIME DELTA IN KEY CERTIFICATE

(75) Inventors: Mohammad Peyravian, Cary, NC (US); Allen Roginsky, Durham, NC (US); Nevenko Zunic, Wappingers Falls, NY (US); Stephen M. Matyas, Jr., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,937

(22) Filed: Dec. 10, 1999

(51) Int. Cl.$^7$ ................................................ H04L 9/00
(52) U.S. Cl. .................... 713/178; 380/277; 713/170
(58) Field of Search ................... 713/170, 175, 713/178, 157, 158, 156, 185, 182; 705/75, 76; 380/277, 45

(56) References Cited

U.S. PATENT DOCUMENTS

| | | | |
|---|---|---|---|
| 5,001,752 A | | 3/1991 | Fischer |
| 5,136,646 A | | 8/1992 | Haber et al. |
| 5,136,647 A | * | 8/1992 | Haber et al. ................ 713/178 |
| 5,373,561 A | | 12/1994 | Haber et al. |
| RE34,954 E | | 5/1995 | Haber et al. |
| 5,422,953 A | * | 6/1995 | Fischer ....................... 713/158 |
| 5,638,443 A | * | 6/1997 | Stefik et al. .................. 705/54 |
| 5,666,416 A | * | 9/1997 | Micali ........................ 713/172 |
| 5,745,574 A | * | 4/1998 | Muftic ........................ 713/157 |
| 5,781,629 A | | 7/1998 | Haber et al. |
| 6,381,695 B2 | * | 4/2002 | Kudo et al. .................. 713/156 |
| 6,381,696 B1 | * | 4/2002 | Doyle ......................... 713/156 |
| 2002/0152383 A1 | * | 10/2002 | Walsh et al. ................ 713/176 |

FOREIGN PATENT DOCUMENTS

WO    WO 99/16209    4/1999

OTHER PUBLICATIONS

Takura et al, A Secure and Trusted Time Stamping Authority, 1999, IEEE Catalog No. 99EX385, INSPEC Access No.: 645344.*

* cited by examiner

*Primary Examiner*—Gilberto Barron
*Assistant Examiner*—Kyung H. Shin
(74) *Attorney, Agent, or Firm*—Coats & Bennett, P.L.L.C.

(57) ABSTRACT

A method for time stamping a digital document is disclosed. The document originator creates a time stamp receipt by combining the document and a digital time indication. The time stamp receipt is submitted to a time stamping agent having a trusted clock. The time stamping agent optionally validates the time stamp receipt and then computes the age of the time stamp receipt. If valid, the time stamping agent certifies the time stamp receipt by signing the time stamp receipt with a private signature key. The private signature key is selected from a group of signature keys by the time stamping agent based on the computed age of the time stamp receipt.

17 Claims, 1 Drawing Sheet

TIME STAMPING METHOD USING TIME DELTA IN KEY CERTIFICATE

BACKGROUND OF THE INVENTION

The present invention relates generally to cryptographic protocols and, more particularly, to a time-stamping protocol for time-stamping digital documents.

There are times when it is desirable to prove the existence of a document as of a particular date. For example, patent disputes concerning the inventorship of an invention often turn on who is able to produce corroborating documentary evidence dating their conception of the invention. A common procedure for dating records is to keep the records in a daily journal or notebook with each page sequentially numbered and dated. Another procedure for dating a record is to have the record witnessed by an uninterested or trusted party that can attest to the existence of the document. The increasing use of computers, however, makes these time-stamping methods obsolete. It is relatively easy to change the date-stamp added to a document by the computer when the document was created. Further, while it is difficult to alter a paper document without leaving some signs of tampering, digital records can be easily altered or revised without leaving any evidence of tampering. Therefore, people are less likely to trust a digital document than a paper document that has been time-stamped using conventional time-stamping procedures.

To be trusted, a time-stamping procedure for digital documents should meet the following criteria:

1. The data itself must be time-stamped, without any regard to the physical medium on which it resides.

2. It must be impossible to change a single bit of the data without that change being apparent.

3. It must be impossible to timestamp a document with a date and time different than the current date and time.

One method for time-stamping a digital document would be to archive the document with a trusted escrow agent. In this case, the document originator sends a copy of the digital document to a trusted escrow agent. The escrow agent records the date and time that the document was received and retains a copy in his archives. Later, if a dispute arises over the date of the document, the document originator can contact the escrow agent who produces his copy of the document and verifies that it was received on a particular date. This time-stamping procedure has a number of drawbacks. First, the document originator must disclose the contents of the document to the escrow agent. Also, large documents take a relatively long period of time to transmit to the escrow agent and they require a large amount of data storage.

An improvement of the escrow procedure is to use a hash of the document. Instead of sending the document to the escrow agent, the document originator hashes the document using a one-way hash algorithm and sends the generated hash value to the escrow agent. The escrow agent stores the hash value along with the date and time that it was received in his archives. Later the document originator can use the services of the escrow agent to prove the existence of the document as of a particular date. The disputed document can be hashed and the resulting hash value can be compared to the hash value stored by the escrow agent in his archives for equality. If the hash values are equal, the document is presumed to be in existence as of the date associated with the stored hash value. One advantage of this method is that the document originator does not need to disclose the contents of the document to the escrow agent.

The need to escrow the document or hash value can be eliminated by having a time stamping authority generate a certified time stamp receipt using a cryptographic signature scheme as taught in U.S. Pat. No. Re. 34,954 to Haber et al. and Fischer, U.S. Pat. No. 5,001,752. In this case, the document originator hashes the document and transmits the hash value to the time stamping authority. The time stamping authority appends the current date and time to the hash value to create a time stamp receipt and digitally signs the time stamp receipt with a private signature key. The time stamping authority's public verification key is distributed and available to anyone interested in validating a time stamp receipt created by time stamping authority. The public verification key is typically stored in a public key certificate signed by a Certification Authority so that anyone desiring to validate the time stamp receipt with the public key can have confidence in the authenticity of the key.

Another approach to time stamping documents is disclosed in PCT WO 99/16209 entitled Method and System For Transient Key Digital Time Stamps. In this application, time stamp receipts are signed by the time stamping authority using transient, time-related keys. The time-stamping authority periodically generates a signature generation key, which is valid for a predetermined interval of time. Documents received during the specified time interval are signed using the key corresponding to that interval. At the end of the interval, a new key is generated for the next interval and the previously used key is discarded. In this manner, a new signature generation key is generated at a predetermined interval of time. The public verification key associated with each private signature generation key is saved for future authentication of the time stamp receipt.

SUMMARY OF THE INVENTION

The present invention is a time-stamping protocol for time-stamping digital documents so that the date of the document can be verified. The method presumes the existence of a trusted agent referred to herein as the time-stamping authority (TSA). According to the present invention, the TSA maintains a plurality of public and private key pairs that are used to sign and verify documents. Each key pair is associated with a predetermined time interval. The document originator creates a time stamp receipt by combining the document or other identifying data proving the substance of a document with a time indication. The document originator sends the time stamp receipt to the TSA. After validating the time stamp receipt, the TSA computes the age of the time stamp receipt and uses the computed age to select a key pair. The time stamp receipt is then signed by the time stamping agent using the private signature key from the selected key pair.

DETAILED DESCRIPTION OF THE INVENTION

Figure 1:
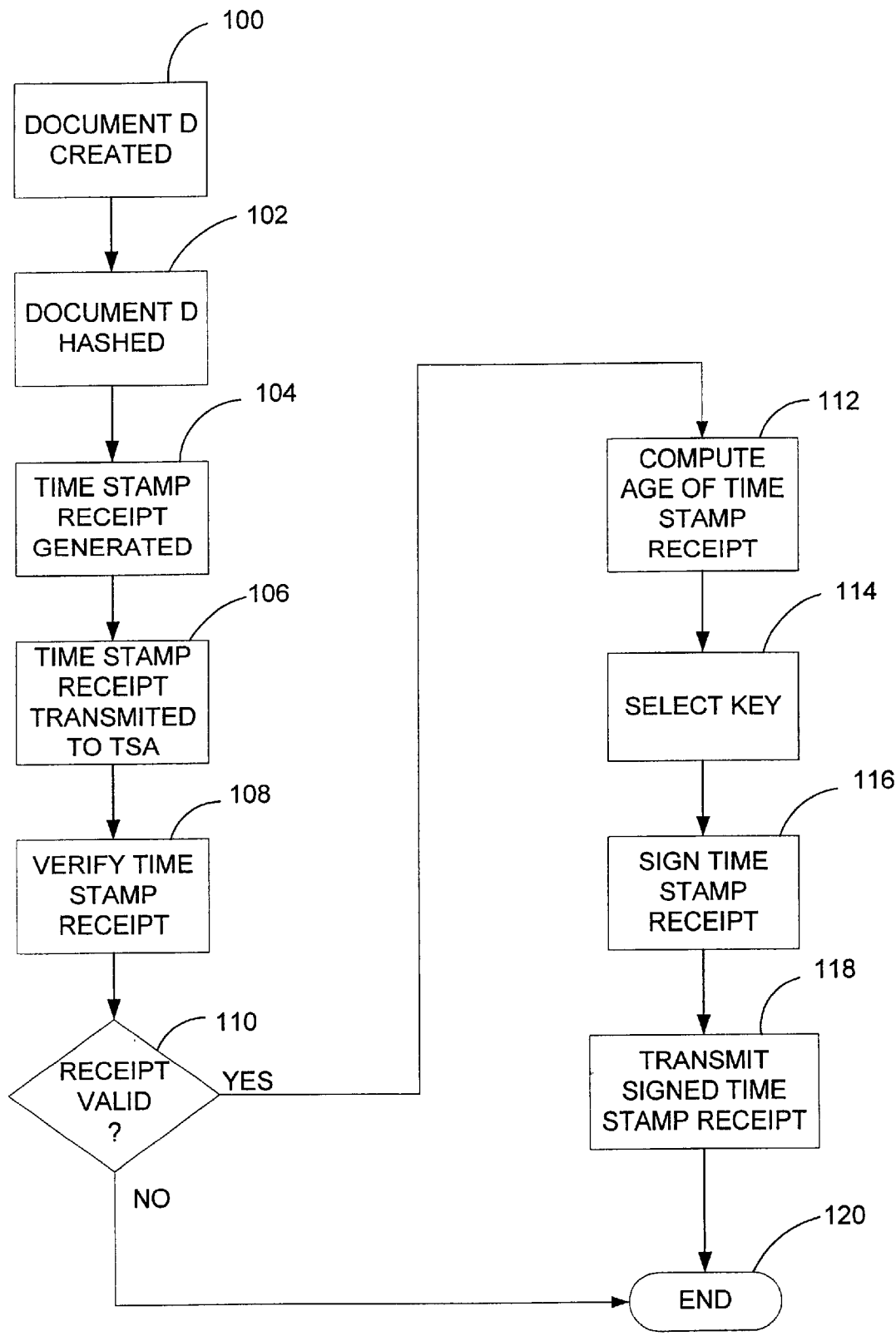
FIG. 1 illustrates an illustrative embodiment of the time stamping method of the present invention.

FIG. 1 is a flow diagram illustrating the general process of time-stamping a document according to the present invention. A document D is created at step 100. The document D is presumed to be in digital form and may comprise any alphanumeric, audio, or graphic presentation of any length. The document D may optionally be hashed at step 102 using a one-way hashing function. A hash function is a function that takes a variable length input string, called a pre-image, and converts it to a fixed-length string, called a hash value, denoted H. The pre-image in this case is the document D or selected portions thereof. A one-way hash function operates in only one direction. While, it is easy to compute a hash value from the pre-image, it is computationally impractical to find a pre-image that hashes to a given hash value. Thus, it is practically impossible to recover the pre-image given the hash value and knowledge of the hash algorithm. Another feature of a hashing function is that it is difficult to find any two pre-images that hash to the same value.

There are several advantages to sending a hash value H produced on document D instead of the document D itself. First, the hash value H improves security by functioning as a fingerprint of the document D. Changing a single bit in the document D will result in an entirely different hash value making it easy to detect efforts to modify a document D or hash value H. Second, the hash value H greatly reduces the amount of data that must be transmitted to the TSA. This factor can be important where the available bandwidth is limited. Third, by sending a hash value H in place of the document D, the content of the document D does not need to be disclosed to the TSA.

Any known hashing function, such as the SHA-1, MD5, and RIPEMD-160, can be used in the present invention. For the remaining description of the time stamping protocol, it will be assumed that the document D has been hashed and that the hash value H has been sent to the TSA in lieu of the document D. It is understood, however, that one can practice the invention by substituting D, selected portions of document D, or some other function of D in place of the hash value H in the protocol.

The document originator generates a time stamp receipt R at step 104 using the hash value H generated on document D and the current time T. Other optional data, such as the originator's identification number ID or a sequential record number SN, could also be included in the time stamp receipt R. The optional data could be provided by the document originator or by another party, such as the TSA. The time stamp receipt R is generated by concatenating the hash value H generated on document D with the current time T and optionally other data, such as the user's identification number ID and a sequential record number SN. The time stamp receipt R is represented by the string (H, T, ID, SN).

After creating the time stamp receipt R, the document originator transmits the time stamp receipt R and other optional data to a time stamping authority TSA at step 106. The TSA verifies at step 108 that the data contained in the time stamp receipt R is consistent with data maintained and controlled by the TSA. For example, the TSA may require, as part of its certification services, that the document originator provide its ID number and a sequential record number SN. In this case, the TSA would verify that the data submitted by the document originator is consistent with data maintained by the TSA. If, for example, the sequential record number was out of sequence, the TSA may refuse to certify the time stamp receipt R.

If the time stamp receipt R submitted by the document originator is determined to be valid at step 110, the TSA computes the age of the time stamp receipt R at step 112. The age of the time stamp receipt R, denoted "A", is determined by computing the difference between the time value T specified in the time stamp receipt R and the time it was received by the TSA, denoted $T_{TSA}$. The TSA maintains a trusted clock for purposes of determining the current time, which is used in computing the age of the time stamp receipt. Alternatively, the TSA may obtain the current time $T_{TSA}$ from a trusted source. The age A of the time stamp receipt R is then used by the TSA to select a private signature key from a group of signature keys maintained by the TSA.

In accordance with the time stamping protocol of the present invention, the TSA maintains a plurality of public and private key pairs ($K_P$, $K_{PR}$) for signing time stamp receipts R. The private signature key $K_{PR}$ in each key pair is known only to the TSA and is used by the TSA to sign time stamp receipts R. The public verification key $K_P$ in each key pair is a signature verification key made available to the public so that anyone interested can verify or authenticate time stamp receipts R signed by the TSA. The public verification keys $K_P$ can be stored in a certificate signed by a Certification Authority CA so that the public keys $K_P$ can be validated and, hence, trusted by those using the public key $K_P$.

Each key pair ($K_P$, $K_{PR}$) is associated with a time interval I consisting of a starting time $T_1$ and an ending time $T_2$. Thus, the time interval I may be denoted by the pair ($T_1$, $T_2$). To illustrate, consider an example in which there are 10 key pairs where each key pair has an associated time internal as follows:

($K_{P1}$, $K_{PR1}$): (0 min., 9 min.)
($K_{P2}$, $K_{PR2}$): (10 min., 19 min.)
($K_{P3}$, $K_{PR3}$): (20 min., 29 min.)
($K_{P4}$, $K_{PR4}$): (30 min., 39 min.)
($K_{P5}$, $K_{PR5}$): (40 min., 49 min.)
($K_{P6}$, $K_{PR6}$): (50 min., 59 min.)
($K_{P7}$, $K_{PR7}$): (60 min., 69 min.)
($K_{P8}$, $K_{PR8}$): (70 min., 79 min.)
($K_{P9}$, $K_{PR9}$): (80 min., 89 min.)
($K_{P10}$, $K_{PR10}$): (90 min., 99 min.)

In the example given above, each key pair ($K_P$, $K_{PR}$) has a different starting and ending time and collectively the 10 intervals cover a larger interval of 99 minutes. The number of key pairs ($K_P$, $K_{PR}$) and the specification of time intervals may be chosen by the TSA. Also, the starting and ending times could be specified in any units (e.g., hours, minutes, seconds). However, the resolution of the time intervals I should be consistent with the resolution of the age computation. If, for example, the age of a time stamp receipt R is computed to the nearest minute, then the time intervals should also be specified in minutes. The time intervals are not associated with specific dates and, therefore, the public and private key pairs associated with these time intervals do not become invalid with the passage of time. The TSA may, however, decide to change keys associated with the time intervals from time to time in keeping with good security practices.

As previously described, the age A of the submitted time stamp receipt R, is used by the TSA to select a private signature key at step 114. When the TSA signs a time stamp receipt R, the private signature key $K_{PR}$ is chosen that corresponds to the computed age A of the time stamp receipt R. If, for example, the computed age A of a time stamp receipt R is 45 minutes, then the TSA would use the private signature key $K_{PR5}$ to sign the time stamp receipt R at step 116 since $K_{PR5}$ corresponds to the interval (40 min, 49 min). More specifically, if A were 40 minutes or 49 minutes, or any value (in minutes) between 40 and 49 minutes, then the private signature key $K_{PR5}$ would be used to sign the time stamp receipt R at step 116. As can be seen from this example, for any value of A between 0 and 99 minutes, there is one private signature key designated for signing the time stamp receipt R. The signed time stamp receipt sig(R) is then transmitted back to the requesting party at step 118, along with a signed public key certificate C containing the corresponding public verification key $K_P$ and the procedure ends. The public key certificate C can be signed by either the TSA or by a Certification Authority CA.

If a dispute arises concerning the date of a document D, the document D can be verified using the signed time stamp receipt R. First, the TSA's signature on the time stamp receipt R is verified using the corresponding public verification key $K_P$ contained in the accompanying public key certificate C. The disputed document D is then verified by computing a hash value H on the disputed document D and comparing the computed hash value to the hash value H contained in the time stamp receipt R for equality. To determine the priority time of the document D, the time difference represented by the time interval I is added to the time indication T contained in the time stamp receipt R. In the example above, where $K_{PR5}$ was used to sign the time stamp receipt R, the age A of the document is a value of at least 40 minutes and not more than 49 minutes. On the other hand, if more public and private key pairs were available, one could have a specific key pair for each interval of one minute. Thus, if A=0, we would sign using one key pair, if A=1, we would sign using another key pair, if A=2, we would sign using yet another key pair, and so forth. The reader will appreciate that the time intervals of the described invention could be made as granular as desired.

One can see for the described invention that the time intervals are not associated with specific dates and times, and hence these time intervals, and the public and private key pairs associated with these time intervals, do not expire with the passage of time. This is so because the time intervals are computed on the basis of age values (relative values) rather than calendar dates (fixed values).

The time-stamping procedures described herein may be implemented using general purpose programmable computers. A client program running on a user's computer could perform the steps of hashing documents, generating time stamp receipts, and transmitting time stamp receipts to the TSA. A server application running on a general purpose programmable computer controlled by the TSA could perform the steps of validating time stamp receipts, signing time stamp receipts, generating certificates, and transmitting signed time stamp receipts to users. It would also be possible to implement some or all of the steps in firmware, or in hard-wired logic.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

We claim:

1. A method for time stamping a document comprising:

receiving a time stamp receipt at an outside agency, said time stamp receipt including identifying data associated with said document and a time indication;

computing the age of said time stamp receipt based on said time indication;

signing said time stamp receipt at said outside agency using a secret signature key, said signature key selected from a group of signature keys based on the computed age of said time stamp receipt.

2. The time stamping method of claim 1 further including transmitting said signed time stamp receipt to a designated party.

3. The time stamping method of claim 1 wherein said identifying data comprises a digital representation of at least a portion of said document.

4. The time stamping method of claim 3 wherein said identifying data comprises a digital sequence derived by application of a deterministic function to at least a portion of said document.

5. The time stamping method of claim 4 wherein said digital sequence is a hash value derived by application of a one-way hashing function to at least a portion of said document.

6. The time stamping method of claim 1 wherein said time stamp receipt further includes an identification number associated with the document originator.

7. The time stamping method of claim 6 wherein said time stamp receipt further includes a sequential record number.

8. The time stamping method of claim 7 further including the step of validating said time stamp receipt.

9. The time stamping method of claim 8 wherein the step of validating said time stamp receipt includes comparing said identification number and sequential record number with data maintained by the outside agency.

10. A method for time stamping a document comprising:

creating a time stamp receipt including identifying data associated with said document and a time indication;

transmitting said time stamp receipt to an outside-agency for certification;

computing the age of said time stamp receipt at said outside agency;

signing said time stamp receipt at said outside agency using a secret signature key, said secret signature key selected from a group of signature keys based on the computed age of said time stamp receipt; and transmitting said signed time stamp receipt from said outside agency to a designated party.

11. The time stamping method of claim 10 wherein said identifying data comprises a digital representation of at least a portion of said document.

12. The time stamping method of claim 11 wherein said identifying data comprises a digital sequence derived by application of a deterministic function to at least a portion of said document.

13. The time stamping method of claim 12 wherein said digital sequence is a hash value derived by application of a one-way hashing function to at least a portion of said document.

14. The time stamping method of claim 10 wherein said time stamp receipt further includes an identification number associated with the document originator.

15. The time stamping method of claim 14 wherein said time stamp receipt further includes a sequential record number.

16. The time stamping method of claim 15 further including the step of validating said time stamp receipt.

17. The time stamping method of claim 16 wherein the step of validating said time stamp receipt includes comparing said identification number and sequential record number with data maintained by the outside agency.

* * * * *